(12) United States Patent
Nakamura et al.

(10) Patent No.: US 7,867,346 B2
(45) Date of Patent: Jan. 11, 2011

(54) JUNCTION SUBSTRATE AND METHOD OF BONDING SUBSTRATES TOGETHER

(75) Inventors: Osamu Nakamura, Kodaira (JP);
Keishi Takeyama, Hamura (JP);
Tsutomu Terazaki, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 933 days.

(21) Appl. No.: 11/677,859

(22) Filed: Feb. 22, 2007

(65) Prior Publication Data
US 2007/0181249 A1 Aug. 9, 2007

Related U.S. Application Data

(62) Division of application No. 10/916,203, filed on Aug. 11, 2004, now Pat. No. 7,205,625.

(30) Foreign Application Priority Data
Aug. 25, 2003 (JP) .............................. 2003-299742

(51) Int. Cl.
*B32B 37/00* (2006.01)
(52) U.S. Cl. .......................................... 156/1; 438/456
(58) Field of Classification Search ...................... 156/1, 156/308.2, 273.9; 65/36, 155; 438/455, 438/456
See application file for complete search history.

(56) References Cited

U.S. PATENT DOCUMENTS

| 4,826,787 | A | 5/1989 | Muto et al. |
| 5,466,631 | A | 11/1995 | Ichikawa et al. |
| 5,591,679 | A | 1/1997 | Jakobsen et al. |
| 5,639,423 | A | 6/1997 | Northrup et al. |
| 6,016,027 | A * | 1/2000 | DeTemple et al. .......... 313/356 |
| 6,172,385 | B1 * | 1/2001 | Duncombe et al. .......... 257/295 |
| 6,426,525 | B1 * | 7/2002 | Brindle ...................... 257/300 |
| 6,943,067 | B2 | 9/2005 | Greenlaw |
| 2003/0129829 | A1 * | 7/2003 | Greenlaw .................... 438/637 |
| 2003/0190508 | A1 * | 10/2003 | Takeyama et al. ............. 429/20 |
| 2004/0115849 | A1 | 6/2004 | Iwafuchi et al. |
| 2004/0148858 | A1 | 8/2004 | Yamamoto et al. |

FOREIGN PATENT DOCUMENTS

| DE | 41 36 075 A1 | 5/1993 |
| EP | 0 742 581 A2 | 11/1996 |
| JP | 2001-228159 A | 8/2001 |
| WO | WO 98/37408 A1 | 8/1998 |
| WO | WO 03/082460 A1 | 10/2003 |

* cited by examiner

*Primary Examiner*—John L Goff
(74) *Attorney, Agent, or Firm*—Holtz, Holtz, Goodman & Chick, PC

(57) ABSTRACT

A junction substrate includes a first substrate, a buffer film formed on one surface of the first substrate, a metal containing film formed on the buffer film and having a lower resistance than the buffer film, and a second substrate bonded to the other surface of the first substrate.

3 Claims, 13 Drawing Sheets

JUNCTION SUBSTRATE AND METHOD OF BONDING SUBSTRATES TOGETHER

CROSS-REFERENCE TO RELATED APPLICATIONS

The present application is a Divisional Application of U.S. application Ser. No. 10/916,203 filed Aug. 11, 2004 now U.S. Pat. No. 7,205,625, which is based upon and claims the benefit of priority from prior Japanese Patent Application No. 2003-299742, filed Aug. 25, 2003, the entire contents of which are incorporated herein by reference.

BACKGROUND OF THE INVENTION

1. Field of the Invention

The present invention relates to a junction substrate composed of a plurality of substrates and a method of bonding the substrates together.

2. Description of the Related Art

In recent years, small-sized reactors called microreactors have been developed. The microreactor is a small-sized reactor in which a plurality of reactants such as materials and reagents are allowed to react with each other while being mixed together. The microreactor is utilized to carry out chemical reaction experiments in micro areas, develop drugs, or develop artificial organs or is utilized as a genome and DNA analysis tool or a basic analysis tool for microfluid engineering. Chemical reactions using the microreactor have characteristics not exhibited by normal chemical reactions using beakers or flasks. For example, the microreactor is advantageous in that the whole reactor is so small as to provide a very high effectiveness of regenerator to allow efficient temperature control required for reactions. Thus, the microreactor makes it possible to quickly and easily accomplish reactions requiring precise temperature control or rapid heating or cooling.

Specifically, the microreactor is formed with, for example, a channel through which reactants flow and a reactor in which reactants react with each other. In Jpn. Pat. Appln. KOKAI Publication No. 2001-228159, a silicon substrate in which a groove with a predetermined pattern is formed is anodically bonded to a Pyrex™ substrate so that they are laminated to each other. A channel is then formed in a closed area between the two substrates. The "anodic bonding" is a bonding technique to apply a high voltage to substrates in a high-temperature environment to generate an electrostatic attraction between the substrates, thus chemically binding the two substrates together at an interface. The anodic bonding is particularly excellent among substrate bonding techniques because the substrates can be strongly bonded together without using any coating agent and in the atmosphere.

Some microreactors are provided with heating means for heating a channel in order to facilitate reactions in the reactor. For example, it is contemplated that to transfer heat to a channel portion via a substrate, a heating resistant film corresponding to the channel pattern and an interconnect made of metal to supply power to the heating resistant film may be formed on a side of a front surface of a glass substrate or the like (the surface of the substrate which is opposite the surface bonded to a silicon substrate). In this case, when the glass substrate and the silicon substrate are anodically bonded together via the heating resistant film and interconnect, electric fields concentrate in parts of the front surface of the glass substrate which are close to the heating resistant film and interconnect. Consequently, Na from the glass substrate is locally precipitated in these parts. As a result, Na may enter the heating resistant film and/or the interconnect, deposited on the heating resistant film in order to apply a voltage to the heating resistant film. These impurities may create fine gaps in the heating resistant film, interconnect film and/or its front surface to make it rough. Consequently, the heating resistant film and/or the interconnect film may be peeled off from the glass substrate or a metal electrode may be peeled off from the heating resistant film.

The present invention is advantageous in that when a glass substrate or the like which contains Na is anodically bonded to another substrate, Na from the substrate is hindered from being locally precipitated.

BRIEF SUMMARY OF THE INVENTION

According to an aspect of the invention, there is provided a junction substrate comprising: a first substrate having one and opposite surfaces; a buffer film formed on the one surface of the first substrate; a metal containing film formed on the buffer film and having a lower resistance than the buffer film; and a second substrate bonded to the opposite surface of the first substrate.

According to this aspect, the buffer film formed on the predetermined surface of the first substrate can hinder Na moved by anodic bonding from reaching the metal containing film. In particular, when the buffer film is wider than the metal containing film, it is possible to prevent electric fields resulting from the anodic bonding from being dispersed to move and concentrate Na near the metal containing film. Consequently, the metal containing film can be prevented from being degraded by Na.

A groove may be formed in at least one of the first and second substrates. The first substrate may be a glass substrate. The first and second substrates are preferably anodically bonded together. The metal containing film may be a member heated when a predetermined voltage is applied to the film.

The buffer film is suitably composed of a Ta—Si—O-based material. The metal containing film is suitably composed of a Ta—Si—O—N-based material.

The buffer film desirably has a high resistance enough to suppress the concentration of electric fields in the metal containing film. The metal containing film desirably has a sheet resistance that is one-thousandth or less of that of the buffer film.

The junction substrate is also applicable to a microreactor. The buffer film preferably has a larger area than the metal containing film.

According to the other aspect of the invention, there is provided a method of bonding a plurality of substrates together to obtain a junction substrate, the method comprising: forming a heating resistant film with a predetermined pattern on a buffer film formed on one surface of a first substrate; abutting the first substrate against a second substrate at the other surface of the first substrate which is opposite the one surface on which the buffer film is formed; and applying a voltage so that the first substrate operates as a negative electrode while the second substrate operates as a positive electrode, to anodically bond the first and second substrates together.

According to this aspect, the first and second substrates are anodically connected together after the buffer film has been formed on the predetermined surface of the first substrate. Accordingly, the buffer film can hinder Na moved by anodic bonding from reaching the heating resistant film. In particular, if the buffer film is wider than the predetermined pattern on the heating resistant film, when a voltage is applied to between an anode and a cathode, an electric field from the cathode is widely dispersed through the buffer film. This results in a uniform field intensity between the anode and the cathode. Therefore, the distribution of the electric field is not biased.

In the above bonding method, the heating resistant film may have a meandering shape having a plurality of longitudinal portions. If the width of each longitudinal portion is defined as $L_A$, the length of each longitudinal portion is defined as $L_B$, the spacing between the adjacent longitudinal portions is defined as $L_C$, the sheet resistance of each longitudinal portion is defined as Sh, and if the sheet resistance of a part of the buffer film which is exposed from between the adjacent longitudinal portions is defined as Sf, the relationship $Sh \times (L_B/L_A) \times 2 \times 100 < Sf \times (L_C/L_B)$ may be met.

When the resistance of the two adjacent longitudinal portions is expressed as $Sh \times (L_B/L_A) \times 2$, the resistance of a part of the buffer film which is exposed from between these two longitudinal portions is expressed as $Sf \times (L_C/L_B)$, and these two resistances meet the relationship $Sh \times (L_B/L_A) 2 \times 100 < Sf (L_C/L_B)$, the resistance of the part of the buffer film which is exposed from between the two longitudinal portions is much higher than that of the two longitudinal portions. When a voltage is applied to both ends of the heating resistant film, a current is unlikely to flow through the buffer film but is likely to flow through the heating resistant film.

According to further aspect of the invention, there is provided a method of bonding a plurality of substrates together to obtain a junction substrate, the method comprising: forming an interconnect film with a predetermined pattern which supplies power to a heating resistant film formed on one surface of a first substrate; abutting the first substrate against a second substrate at the other surface of the first substrate which is opposite the surface on which the heating resistant film is formed; and applying a voltage so that the first substrate operates as a negative electrode while the second substrate operates as a positive electrode, to anodically bond the first and second substrates together.

With the method according to this aspect, the heating resistant film formed on the predetermined surface of the first substrate can hinder Na moved by anodic bonding from reaching the metal containing film. Consequently, the metal containing film can be prevented from being degraded by Na. In particular, when the heating resistant film is wider than the metal containing film, it is possible to prevent electric fields resulting from the anodic bonding from being dispersed to move and concentrate Na near the metal containing film.

According to further aspect of the invention, there is provided a method of bonding a plurality of substrates together to obtain a junction substrate, the method comprising: forming a heating resistant film on a buffer film formed on one surface of a first substrate; forming an interconnect film with a predetermined pattern on the heating resistant film, through which power is to be supplied to the heating resistant film; abutting the first substrate against a second substrate at the other surface of the first substrate which is opposite the surface on which the buffer film is formed; and applying a voltage so that the first substrate operates as a negative electrode while the second substrate operates as a positive electrode, to anodically bond the first and second substrates together.

With the method according to this aspect, the first and second substrates are anodically bonded together after the buffer film has been formed on the predetermined surface of the first substrate. Accordingly, the buffer film can hinder Na moved by anodic bonding from reaching the heating resistant film and interconnect film. In particular, if the buffer film is wider than the predetermined pattern on the heating resistant film, when a voltage is applied to between an anode and a cathode, electric fields from the cathode are dispersed through the buffer film. This results in a uniform field intensity between the anode and the cathode. Therefore, the distribution of electric fields is not biased. This in turn prevents the localization of Na and thus the local degradation of the heating resistant film and interconnect film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

With reference to the drawings, description will be given of the best modes for carrying out the present invention. However, the scope of the present invention is not limited to the illustrated examples.

First Embodiment

Figure 1:
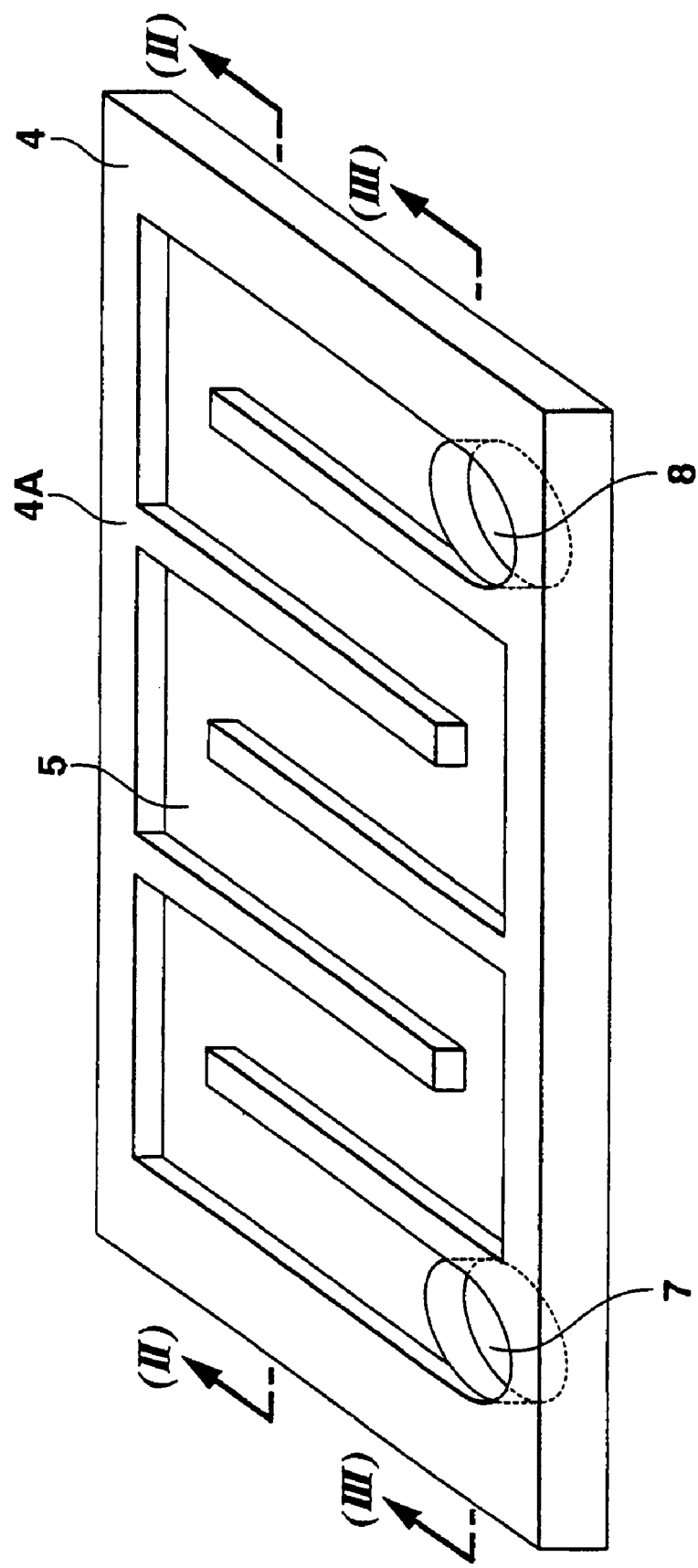
FIG. 1 is a perspective view of a substrate in which a groove as a concave portion is formed.

Description will be given of a first embodiment of a method of bonding substrates together according the present invention. FIG. 1 is a perspective view illustrating a substrate to be bonded to another. Specifically, the substrate 4 is composed of, for example, a silicon substrate or glass substrate having one surface 4A coated with a thin conductive film. The substrate 4 has a predetermined thickness and is rectangular. The surface 4A and an opposite surface 4B are formed to be flat and parallel to each other. The substrate 4 has a concave portion 5 formed in the surface 4A and composed of one groove meandering zigzag. An inlet 7 is formed at one end of the groove so as to penetrate the substrate 4 in its thickness direction. An outlet 8 is formed at the other end of groove so as to penetrate the substrate 4 in its thickness direction. A fluid flows into the inlet 7 and flows out of the outlet 8.

Figure 2:
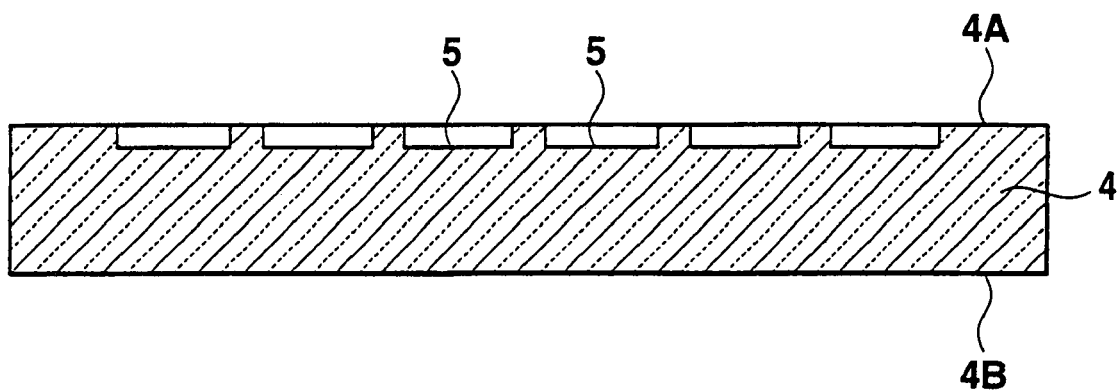
FIG. 2 is a sectional view taken along a line (II)-(II) in FIG. 1 in a thickness direction.
Figure 3:
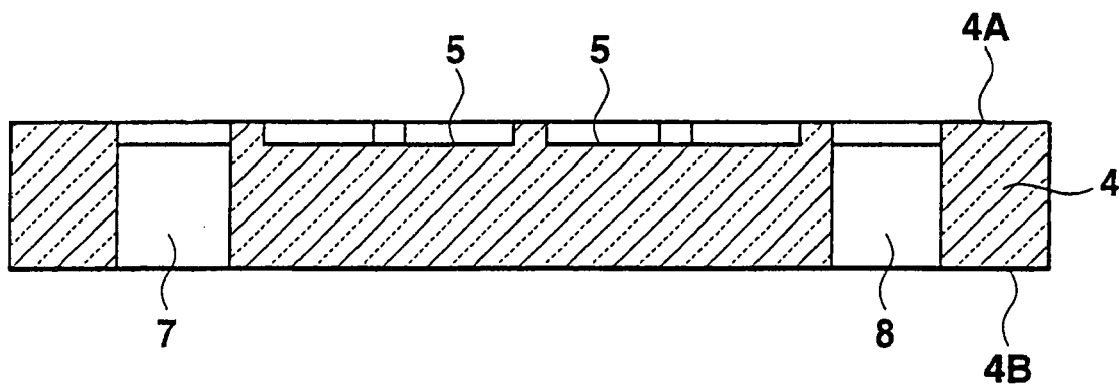
FIG. 3 is a sectional view taken along a line (III)-(III) in FIG. 1 in the thickness direction.

In a first step of a method of processing the substrate 4, a predetermined mask is used to pattern the concave portion 5, constituting a groove of depth 0.1 to 1.5 mm, by mechanical etching such as sand blast or chemical etching using an etchant. Similarly, both ends of the groove are mechanically or chemically etched to form through-holes constituting the inlet 7 and outlet 8. If glass is used as the substrate 4, an oxidized film may be formed on the surface 4A so as to be oxidized during an anodic bonding, described later. In this case, a protective film is coated on the oxidized film so as to prevent the oxidized film being oxidized when the concave portion 5, the inlet 7, and the outlet 8 are formed. FIG. 2 is a sectional view of the substrate 4 taken along a line (II)-(II) in FIG. 1 in the thickness direction of the substrate 4. FIG. 3 is a sectional view of the substrate 4 taken along a line (III)-(III) in FIG. 1 in the thickness direction of the substrate 4.

Figure 4:
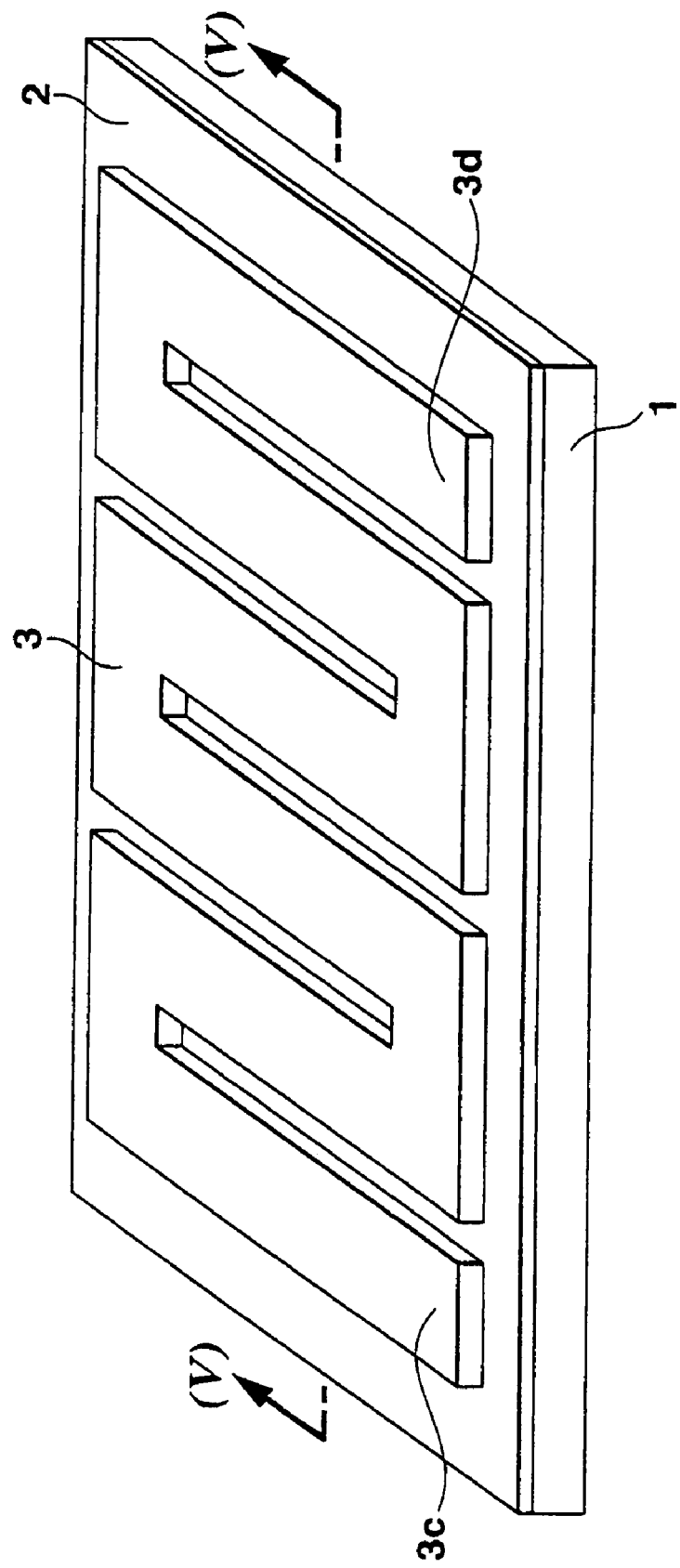
FIG. 4 is a perspective view of a substrate to be bonded to the substrate shown in FIG. 1.

As shown in FIG. 4, a glass substrate 1 to be bonded to the substrate 4 has a buffer film 2 coated all over its surface 1A. A meandering heating resistant film 3 is provided on a front surface of the buffer film 2. An opposite surface 1B of the glass substrate 1 is anodically bonded to the surface 4A of the substrate 4.

Figure 5:
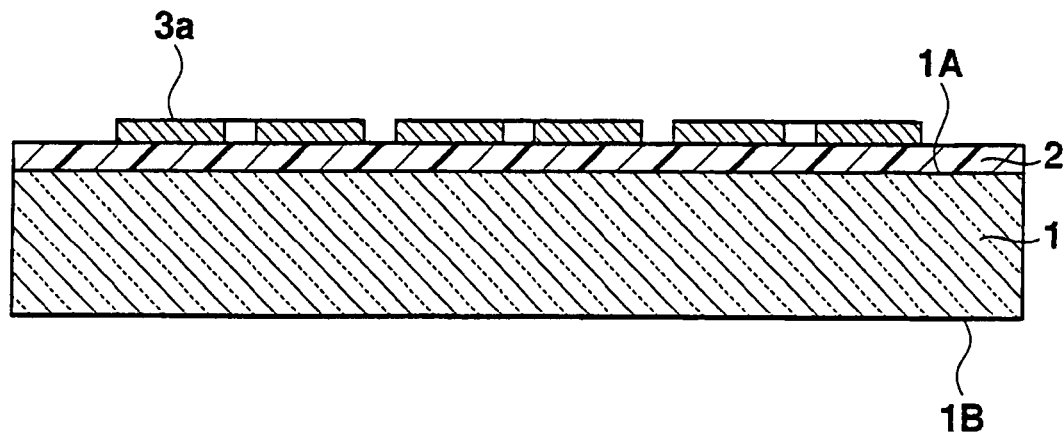
FIG. 5 is a sectional view taken along a line (V)-(V) in FIG. 4 in a thickness direction.

Like the case of the substrate 4, the surfaces 1A and 1B of the glass substrate 1 are formed to be flat and parallel to each other and are designed so that the entire surface 1b abuts against the surface 4A of the substrate 4. Specifically, the glass substrate 1 is made of Pyrex (made by CORNING) containing several % of $Na_2O$ or soda-lime glass. FIG. 5 is a sectional view of the substrate 1 taken along a line (V)-(V) in FIG. 4 in the thickness direction of the substrate 1. The buffer film 2 has a larger film formation area than the heating resistant film 3.

A first step of a method of processing the glass substrate 1 comprises forming the buffer film 2 on a bottom surface of the glass substrate 1 so as to cover almost the entire bottom surface. The buffer film 2 is set to have a sheet resistance (surface resistance rate) higher than that of the heat resistant film 3, specifically, a sheet resistance set at of 1 to 1000 $M\Omega/\square$. Preferably, such a material which has a high resistance and which is not degraded under high temperature during an anodic bonding is, for example, a compound material composed of Ta, Si, and O (hereinafter referred to as a "Ta—Si—O-based material") or a compound material composed of Ta, Si, O, and N (hereinafter referred to as a "Ta—Si—O—N-based material").

To form the buffer film 2, the glass substrate 1 is first set in a sputtering apparatus as a target to be coated. Subsequently, a Ta plate in which Si has been buried (Ta:Si=3:1) is used as a target to carry out sputtering in an atmosphere composed of an Ar gas and an $O_2$ gas. In the sputtering step, ions collide against the target to emit secondary ions from the target. The emitted secondary ions collide against the bottom surface of the glass substrate 1 to form the buffer film 2 of the Ta—Si—O-based material on the bottom surface of the glass substrate 1. If a Ta—Si—O—N-based material is manufactured, a target composed of a Ta plate in which Si has been buried may be used in an atmosphere composed of an Ar, $O_2$, and $N_2$ gases.

Once the buffer film 2 has been formed, the meandering heating resistant film 3, which is heated when a voltage is applied to the film 3, is formed on a front surface of the buffer film. The heating resistant film 3 is formed to have a lower sheet resistance than the buffer film 2 and preferably has a sheet resistance one-thousandth or less of that of the buffer film 2. Provided that the buffer film 2 is a Ta—Si—O-based material, a heating resistant film 3 may be formed by Ta—Si—O-based material, for examples, having a sheet resistance of about 100 to 1,000 $\Omega/\square$. Provided that the buffer film 2 is a Ta—Si—O—N-based material, metal such as CU or Pt which is 0.01 to 1 $\Omega/\square$ in sheet resistance may be used to form the heating resistant film 3.

A method of forming the heating resistant film 3 by the Ta—Si—O-based material into is executed in almost the same manner as that used to form the buffer film 2. That is, a plate formed of Ta and in which Si has been buried (Ta:Si=3:1) is prepared as a target. The glass substrate 1 is then set in the sputtering apparatus so that the buffer film 2 is to be coated. Then, sputtering is carried out in an atmosphere composed of an Ar, $O_2$, and $N_2$ gases while using a mask with a meandering opening to cover the buffer film 2.

In the step of forming the heating resistant film 3, a well-known photolithography technique may be used to form the heating resistant film 3 on the bottom surface of the buffer film 2. The heating resistant film 3 may then be patterned to meander.

Where the heating resistant film 3 is formed, the heating resistant film 3 may be patterned to meander along the concave portion 5 when the glass substrate 1 is laminated to the substrate 4 in which the meandering concave portion 5 is formed. Further, provided that the heating resistant film 3 is formed so as to cover the concave portion 5, it may be rectangular or have any other shape. Once the glass substrate 1 and the substrate 4 are bonded together, the concave portion 5 may be allowed to function as a channel through which a fluid composed of a mixture of one or more types of materials flows. In this case, when the heating resistant film 3 is formed to meander along the concave portion 5, the interior of the channel in the concave portion 5 can be uniformly and efficiently heated. The heating resistant film 3 is preferably wider than the corresponding portion of the concave portion 5.

Figure 6:
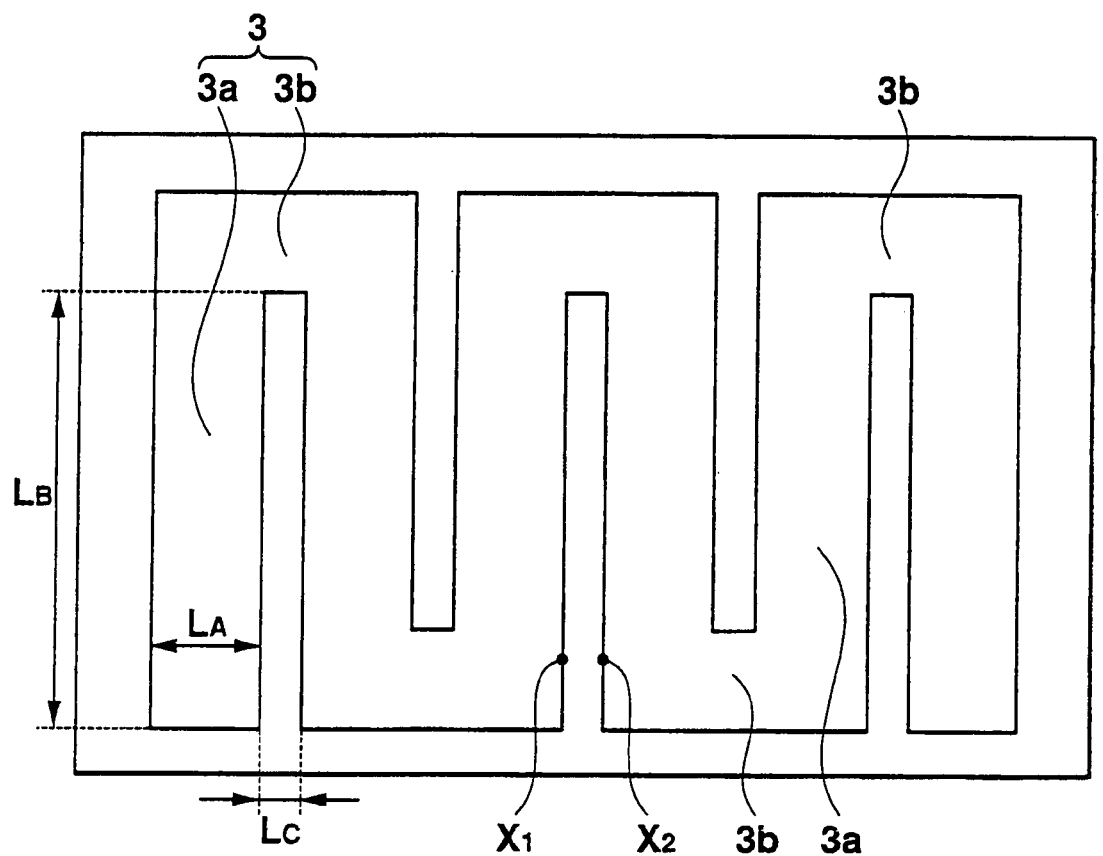
FIG. 6 is a plan view of the substrate shown in FIG. 4.

The step of forming the heating resistant film 3 allows the heating resistant film 3 to be patterned to generally meander so that a plurality of longitudinal portions 3a each having a predetermined length and width are connected together by latitudinal portions 3a as shown in FIG. 6. The longitudinal portions 3a extend perpendicularly to the latitudinal portions 3b.

Here, the longitudinal resistance of each longitudinal portion 3a of the heating resistant film 3 is defined as Sh. The width of each longitudinal portion 3a is defined as $L_A$. The length of each longitudinal portion 3a is defined as $L_B$. The spacing between the adjacent longitudinal portions 3a is defined as $L_C$. The sheet resistance of a part of the buffer film 2 which is exposed from between the two longitudinal portions 3a is defined as Sf. Then, the resistance of a part of the heating resistant film 3 between points $x_1$ and $x_2$ on a line parallel to a direction in which the latitudinal portions 3b of the heating resistant film 3 extend is generally expressed as $Sh \times (L_B/L_A) \times 2$. The resistance of the part of the buffer film 2 between the points $x_1$ and $x_2$ is expressed as $Sf \times (L_C/L_B)$.

In the first embodiment, the buffer film 2 and the heating resistant film 3 are desirably formed on the glass substrate 1 so that the longitudinal resistance of the two adjacent longitudinal portions 3a and the resistance of the part of the buffer film 2 which is exposed from between the two longitudinal portions 3a meet Equation (1), shown below.

$$Sh \times (L_B/L_A) \times 2 \times 100 < Sf \times (L_C/L_B) \quad (1)$$

On the basis of Equation (1), the buffer film 2 and the heating resistant film 3 are formed on the glass substrate 1 so that the resistance of the part of the heating resistant film 3 between the points $X_1$ and $X_2$ is one-hundredth or less of that of the part of the buffer film between the points $X_1$ and $X_2$. Then, when a voltage is applied to between both ends 3c and 3d of the heating resistant film 3, a current is sufficiently hindered from flowing through a part of the buffer film 2 between the points $X_1$ and $X_2$ which has a shorter minimum distance than the heating resistant film 3. On the other hand, a current is sufficiently allowed to flow through the heating resistant film 3, which can thus be heated efficiently.

Figure 7:
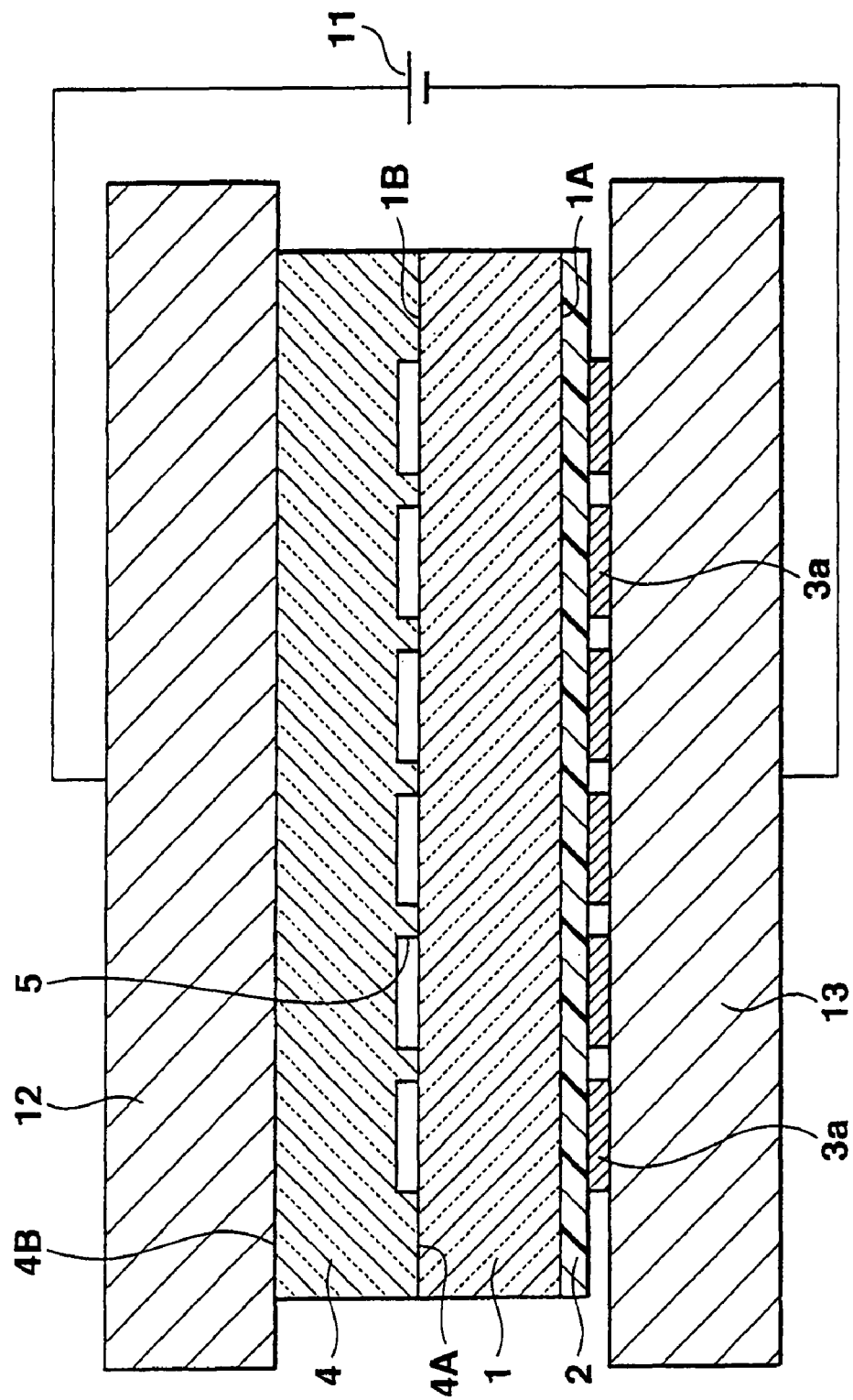
FIG. 7 is a sectional view showing an anodic bonding.

Once the substrate 4 in which the concave portion 5 is formed and the glass substrate 1 on which the buffer film 2 and the heating resistant film 3 are formed have been respectively prepared, the steps described below are executed as shown in FIG. 7. The surface 4A of the substrate 4 is abutted against the top surface 1B of the glass substrate 1 (the surface opposite to the one on which the buffer film 2 and the heating resistant film 3 are formed). A positive electrode 12 of an anodic bonding device 11 is connected to the surface 4B of the substrate 4 to allow the substrate 4 to operate as an anode. At this time, the substrate 1 and the buffer film 2 are not in direct contact with a negative electrode 13. In this state, the substrates 1 and 4 are heated to 300 to 500° C. Then, the anodic bonding device 11 applies a voltage of 300 to 1,000 V to the substrates 1 and 4 to anodically bond them together. At this time, the negative electrode 13 is in contact with the entire surface of the heating resistant film 3 including the longitudinal portions 3a and the latitudinal portions 3b in order to maximize the area of contact with the glass substrate 1. Thus, oxygen atoms present near the surface 1A of the glass substrate 1 are chemically bonded to atoms in the surface 4A of the substrate 4 to bond the substrate 4 and the glass substrate 1 together. After the anodic bonding, electrode interconnects are disposed at the respective ends 3c and 3d of the heating resistant film 3. The electrode interconnects are composed of three layers, that is, a W—Ti layer that is an underlying layer, an Au layer that is an intermediate layer, and a Ti layer that is a top layer.

Figure 8:
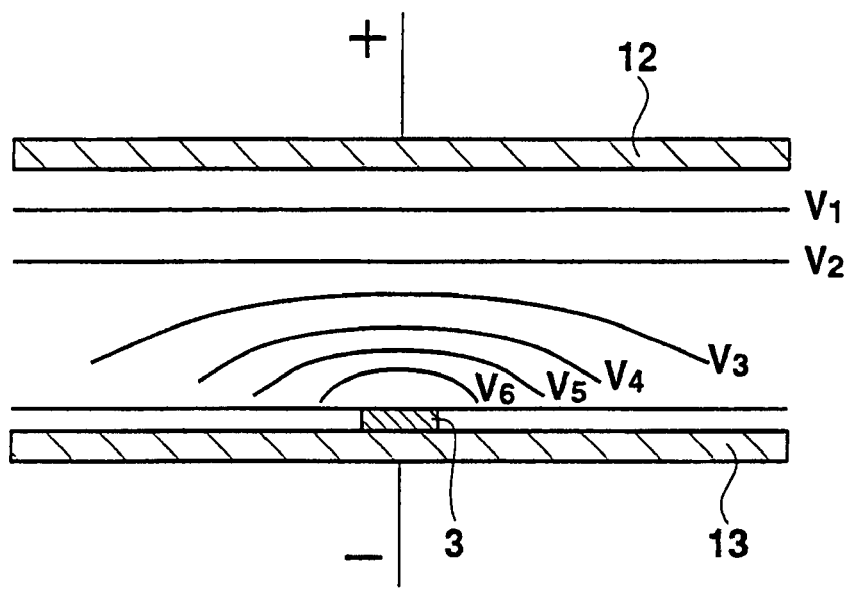
FIG. 8 is a diagram illustrating the distribution of field intensities in connection with an anodic bonding according to a comparative example.
Figure 9:
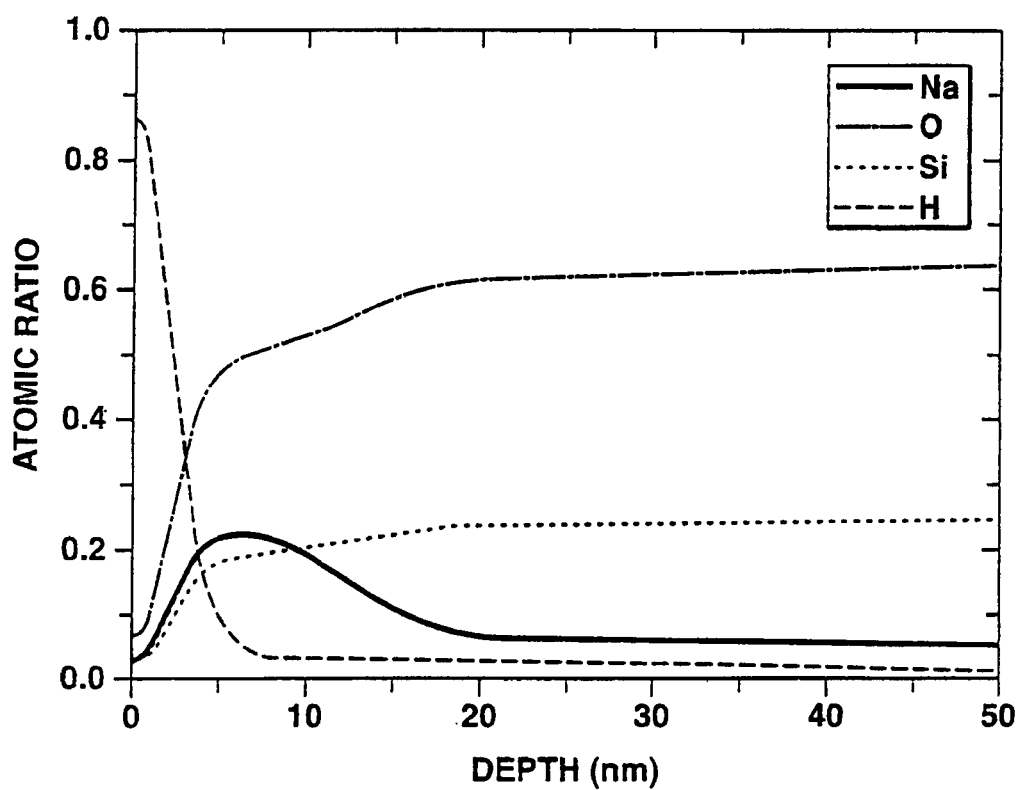
FIG. 9 is a graph showing the composition of a front surface of a glass substrate film in its thickness direction during anodic bonding according to the present invention.

When the buffer film 2 is thus formed so as to cover almost the entire bottom surface of the glass substrate 1, and the glass substrate 1, and the substrate 4 are anodically bonded together, an electric field from the negative electrode of the anodic bonding device 11 passes through the heating resistant film 3 and is widely dispersed within the buffer film 2. The anodic bonding between the glass substrate 1 and the substrate 4 will be approximately described below. In a comparative example in which the buffer film 2 is not formed, equipotential lines LV1 to LV7 (a voltage value increases in the order of LV1, LV2, LV3, LV4, LV5, and LV6) are arranged at small intervals and field intensities concentrate in a part of the glass substrate 1 which is close to the heating resistant film 3 contacted with the negative electrode 13 of the anodic bonding device 11 as shown in FIG. 8. The electric field moves Na ions from the glass substrate 1 and locally precipitate the ions, as a glass composition, on a part of the surface 1A which is close to the heating resistant film 3. However, the Na ions may corrode the heating resistant film 3 in its thickness direction. This makes it difficult that the heating resistant film 3 functions as a heating resistor. FIG. 9 is a graph of the composition of elements in the front surface of the anodically bonded glass substrate 1 shown in FIG. 8, the composition being determined by RBS/HFS analysis. This figure indicates that the surface is Na-rich glass. Further, hydrogen concentrating near the front surface is derived from water molecules. A relatively large amount of the hydrogen is present over the thickness direction of the glass substrate 1 and may thus cause corrosion.

Figure 10:
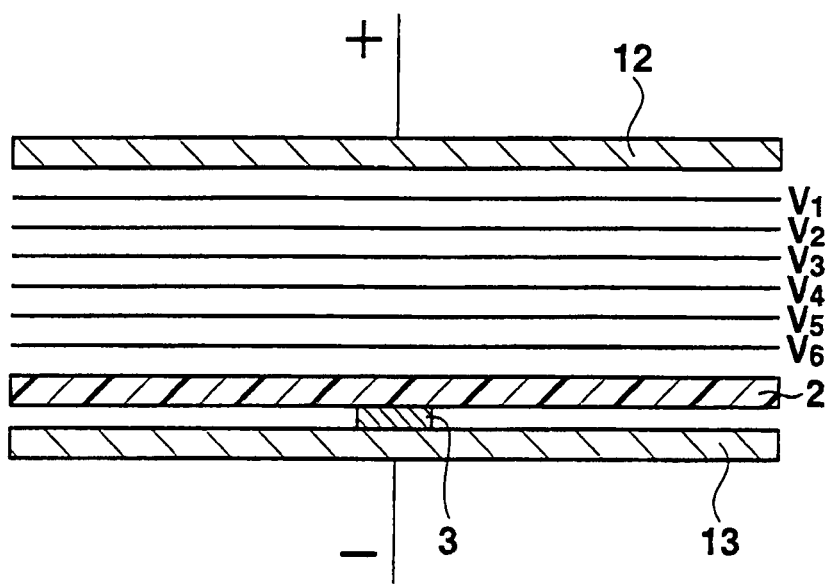
FIG. 10 is a diagram illustrating the distribution of field intensities during an anodic bonding according to the present invention.
Figure 11:
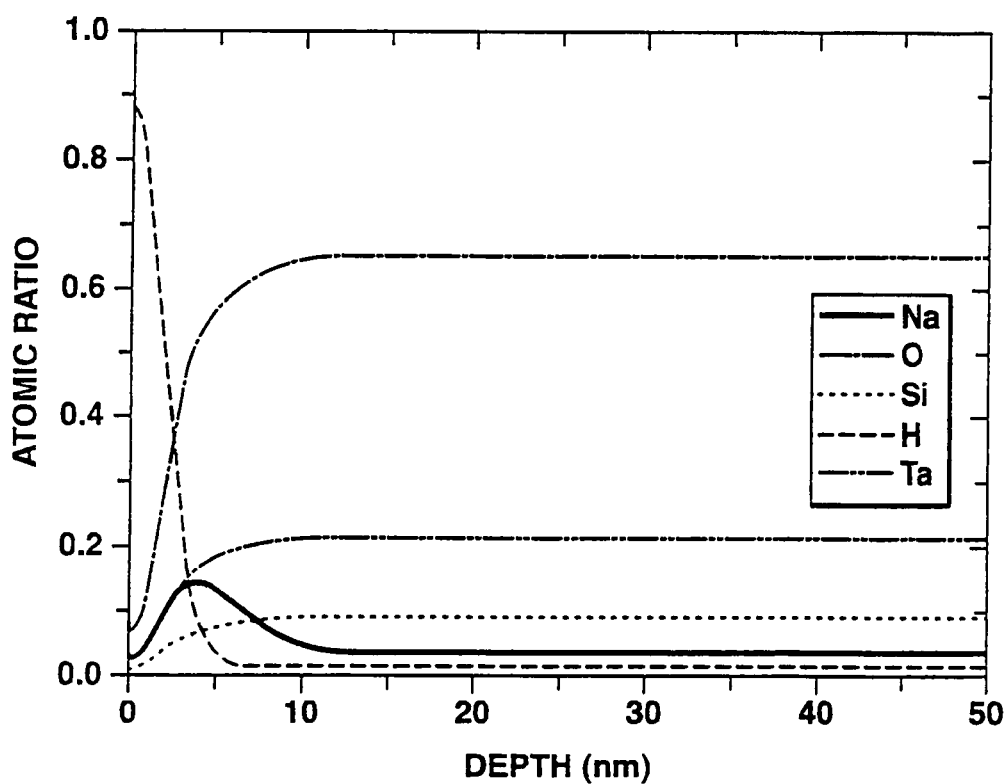
FIG. 11 is a graph showing the composition of a front surface of a buffer film in its thickness direction during anodic bonding according to the present invention.

In contrast, in the first embodiment, the buffer film 2 having a higher resistance and a larger width than the heating resistant film 3 is formed between the glass substrate 1 and the high resistant film 3. Then, the biasing of the field intensities is suppressed between the positive electrode 12 and negative electrode 13 of the anodic bonding device 11, and the intervals of the equipotential lines LV1 to LV7 are almost uniform, as shown in FIG. 10. FIG. 11 is a graph of the composition of elements in the front surface of the anodically bonded glass substrate 1 shown in FIG. 10, the composition being determined by RBS/HFS analysis. This figure indicates that the Na composition ratio is reduced near the front surface of the buffer film 2 compared to the comparative example. In this manner, the provision of the buffer film 2 enables Na contained in the glass substrate 1 to be locally precipitated on the bottom surface of the glass substrate 1. Further, the Ta—Si—O-based material of the buffer film 2 has a moderately dense structure. Accordingly, the buffer film 2 itself operates as a barrier to the movement of Na to some degree and can take in Na. Consequently, Na is not locally present near the interface of the surface 1A of the glass substrate 1. Furthermore, the concentration of Na is hindered from being high near the heating resistant film 3, that is, at the front surface of the buffer film 2. This in turn hinders the heating resistant film 3, formed on the buffer film 2, from being fragile in the presence of Na. It is thus possible to prevent the heating resistant film 3 from peeling off from the glass substrate 1. Moreover, the concentration of hydrogen is relatively low over the thickness direction of the heating resistant film 3. This indicates that water is hindered from entering the glass substrate 1. It is thus possible to prevent water from affecting reactions in the glass substrate 1, operating as a microreactor.

In the first embodiment, in the step of forming the buffer film 2, sputtering was carried out in an atmosphere composed of 99 vol % of Ar gas and 1 vol % of $O_2$ gas at a pressure of 10 Torr, to form a buffer film 2 having a sheet resistance Sh of 1000 kΩ/□.

In the step of forming the heat generation film 3, the meandering high resistant film 3 was formed in which each longitudinal portion 3a had a width $L_A$ of 100 μm, a length $L_B$ of 4,000 μm, and a sheet resistance Sh of 0.5 kΩ/□ and in which the spacing $L_C$ between the adjacent longitudinal portions 3a was 100 μm.

In this case, each longitudinal portion 3a offers a resistance $Sh \times (L_B/L_A)$ of 0.5 Ω/□ × 4000 μm/100 μm = 20 Ω. The part of the buffer film 2 which is exposed from between the longitudinal portions 3a offers a resistance Sf×(C/B) of 1,000 kΩ/□×100 μm/4000 μm=25 kΩ.

Consequently, the resistance (25 kΩ) of the part of the buffer film 2 which is exposed from between the two longitudinal portions 3a is much higher than the resistance (20× 2=40Ω; precisely speaking, the resistance of one latitudinal portion 3b joining the two adjacent longitudinal portions 3a together should be added) of the two longitudinal portions 3a of the heating resistant film 3. The relationship in Equation (1), shown above, is thus met.

In this state, when a voltage was applied between both ends 3c and 3d of the heating resistant film 3, the heating resistant film 3,,patterned to meander, was able to be efficiently heated, while the flow of an excessive current through the buffer film 2 was prevented.

In the first embodiment, the anodic bonding is accomplished by contacting the negative electrode 13 of the anodic bonding device 11 only with the heating resistant film 3. However, the present invention is not limited to this aspect. The anodic bonding may be accomplished by contacting the negative electrode 13 with both the heating resistance film 3 and the exposed part of the buffer film 2.

Second Embodiment

Description will be given of a second embodiment of a method of bonding substrates together according to the present invention. In the second embodiment, components similar to those described in the first embodiment are denoted by the same reference numerals. Their detailed description is omitted.

Figure 12:
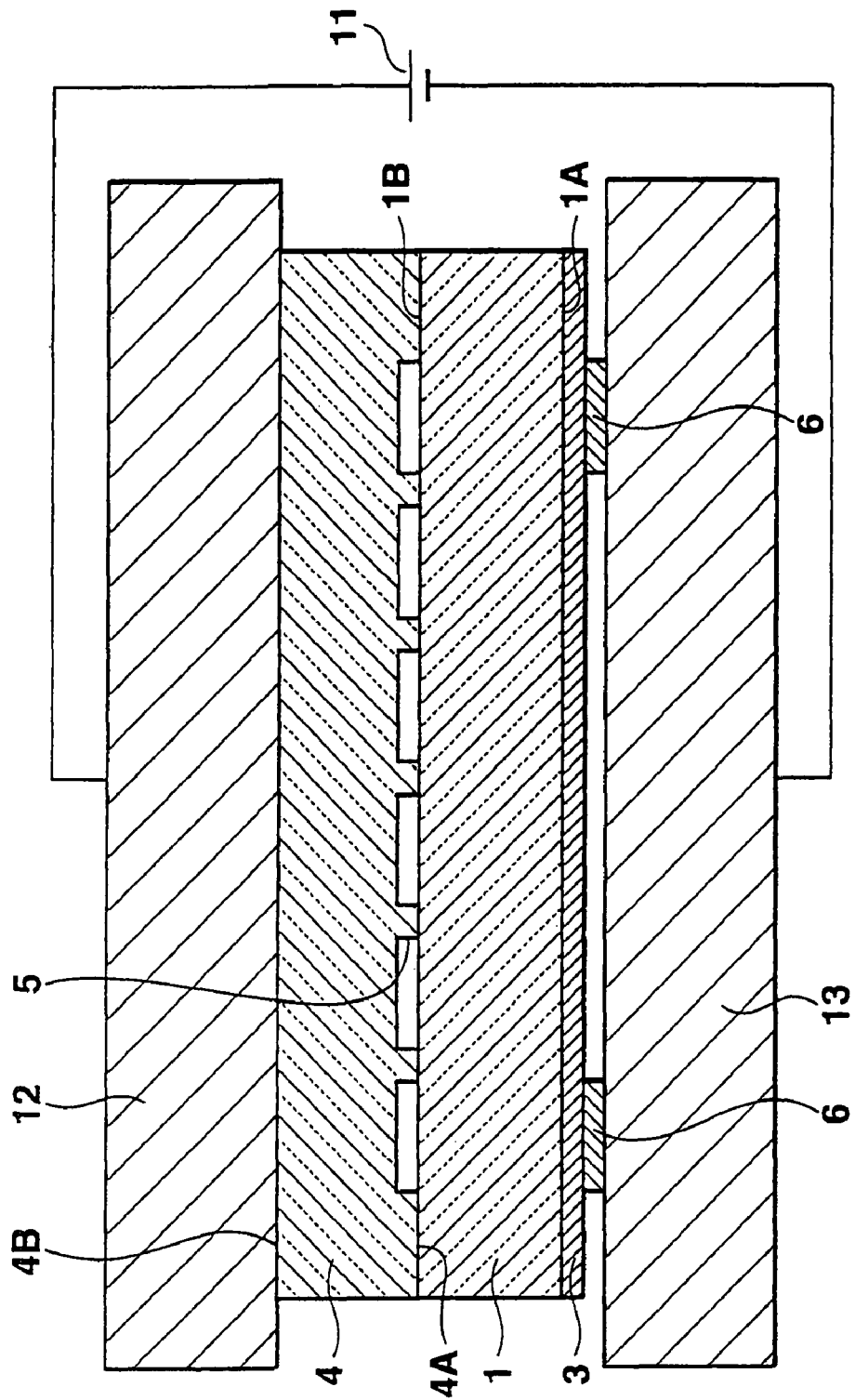
FIG. 12 is a sectional view showing an anodic bonding according to a second embodiment of the present invention.

First as shown in FIG. 12, the glass substrate 1 is prepared. Sputtering is carried out as described in the first embodiment to form the heating resistant film 3 composed of a Ta—Si—O—N-based material or the like, on the bottom surface of the glass substrate 1. However, in this film forming step, the rectangular heating resistant film 3 is formed so as to cover substantially the entire bottom surface of the glass substrate 1 (specifically, the heating resistant film 3 has only to cover 80% or more of the bottom surface of the glass substrate 1) rather than being patterned to meander. The heating resistant film 3 offers a sheet resistance of at least 100 kΩ/□.

Figure 13:
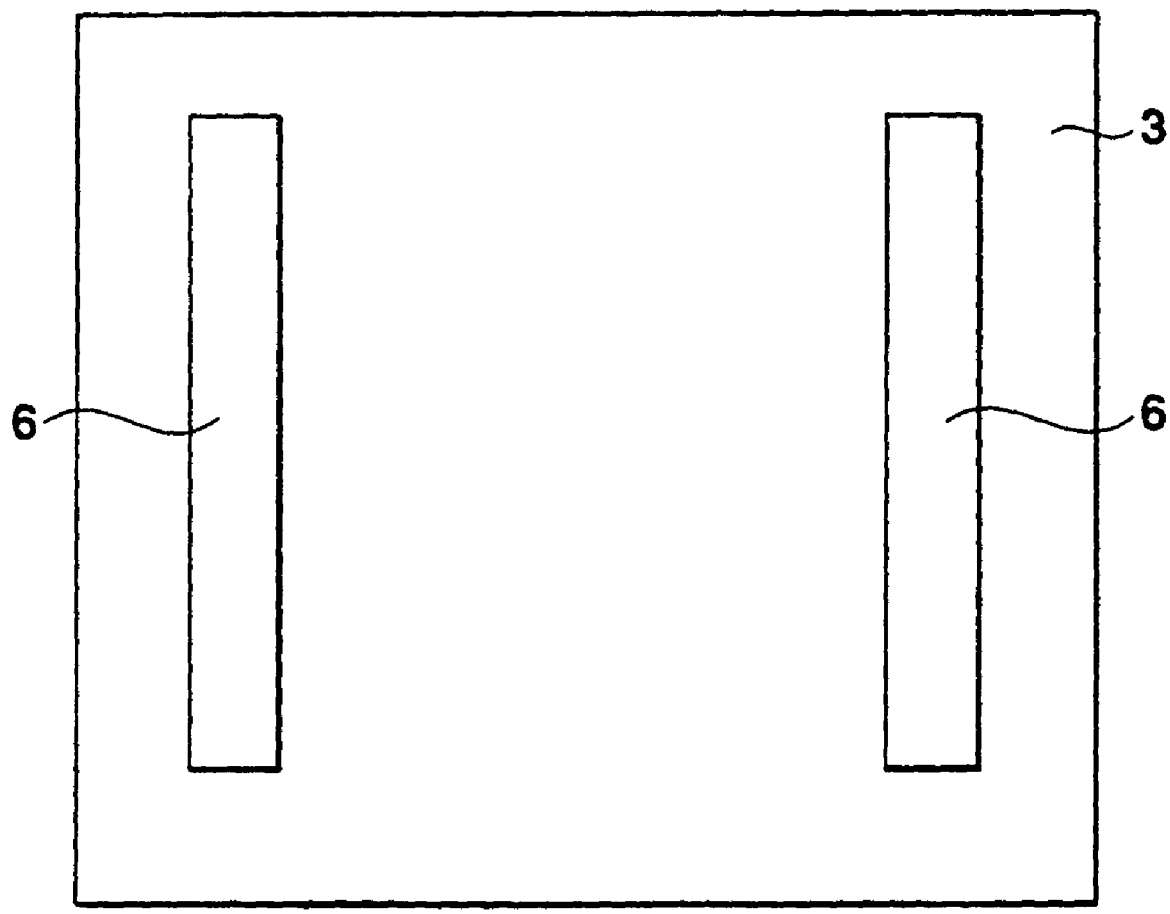
FIG. 13 is a plan view of a substrate according to the second embodiment.

Once the heating resistant film 3 has been formed on the surface 1A of the glass substrate 1, a pair of interconnects 6 are formed on the front surface of the heating resistant film 3, as shown in FIG. 13. The interconnects 6 function as an electrode interconnect through which power is supplied to the heating resistant film 3. Each of the interconnects 6 is composed of three layers of metal, that is, a W—Ti layer/Au layer/W—Ti layer. W—Ti is an alloy of tungsten and titanium and is appropriately bonded to Ta—Si—O-based, Ta—Si—O—N-based, and other metal oxides as well as metals such as Au. W—Ti functions as an underlying protective film for Au. Au is a low-resistance material and functions as the main part of the interconnect. Au is not appropriately bonded to the metal oxide but is excellently bonded to W—Ti. The interconnects 6 offer a resistance that is lower than that of the heating resistant film 3, desirably one-hundredth or less of that of the heating resistant film 3. The interconnects 6 function as the main part of an electrode that supplies power to the heating resistant film 3.

The interconnects 6 are formed by a well-known photolithography, etching, and/or sputtering process as in the case of the first embodiment. If the interconnects 6 are formed, the linear interconnects 6 with long sides lying opposite and away from each other are patterned and formed at a right and left positions, respectively, of the substrate 1 so that the whole concave portion 5 in the heating resistant film 3 can be sufficiently heated after the glass substrate 1 and the substrate 4 have been bonded together. The shortest distance between the interconnects 6 is the same at any positions. Thus, when a voltage is applied between the interconnects 6, the heating resistant film 3 can be uniformly and efficiently heated between the interconnects 6.

Once the glass substrate 1 on one side of which the heating resistant film 3 and the interconnects 6 are formed and the substrate 4 have been prepared, the steps described below are executed as shown in FIG. 12. First, the surface 1B of the glass substrate 1 opposite to the surface 1A on which the heating resistant film 3 is formed is abutted against the surface 4A of the substrate 4 in which the concave portion or groove 5 is formed. Then, the surface 4B of the substrate 4 is connected to the positive electrode 12 of the anodic bonding device 11, while the negative electrode 13 of the anodic bonding device 11 is connected to the interconnects 6. An anodic bonding is thus accomplished to bond the glass substrate 1 and the substrate 4 together. An electric field on the glass substrate 1 is prevented from concentrating near the interconnects 6 because the buffer film 2 in the first embodiment is replaced with the heating resistant film 3, while the heating resistant film 2 in the first embodiment is replaced with the interconnects 6, so that the heating resistant film 3 functions as a buffer film. The sodium in the glass substrate 1 is uniformly dispersed through the heating resistant film 3. This makes it possible to reduce the concentration of the sodium in the interconnects 6 and in the parts of the front surface of the heating resistant film 3 which are close to the interconnects 6.

The negative electrode 13 of the anodic bonding device 11 may be selectively connected only to the front surface of the heating resistant film 3 rather than being connected only to the interconnects 6 as described above. Alternatively, the negative electrode 13 of the anodic bonding device 11 may be connected to both heating resistant film 3 and interconnects 6. In either way, when the heating resistant film 3 is formed so as to cover almost the entire surface 1A before the glass substrate 1 and the substrate 4 are anodically bonded together, an electric field from the negative electrode 13 of the anodic bonding device 11 is widely dispersed through the heating resistant film 3. This avoids locally concentrating the electric field between the positive electrode and negative electrode 13 of the anodic bonding device 11 as in the case of the first embodiment. Therefore, the field intensities are uniform in the thickness direction of the glass substrate 1, thus avoiding the biasing of the distribution of the electric field. Thus, in the second embodiment, Na in the glass substrate 1 is prevented from being locally precipitated. Further, the linearly formed power-supplying interconnects 6 can be prevented from peeling off from the glass. substrate 1.

Third Embodiment

Description will be given of a third embodiment of a method of bonding substrates together according to the present invention. In the third embodiment, components similar to those described in the first and second embodiments are denoted by the same reference numerals. Their detailed description is omitted.

Figure 14:
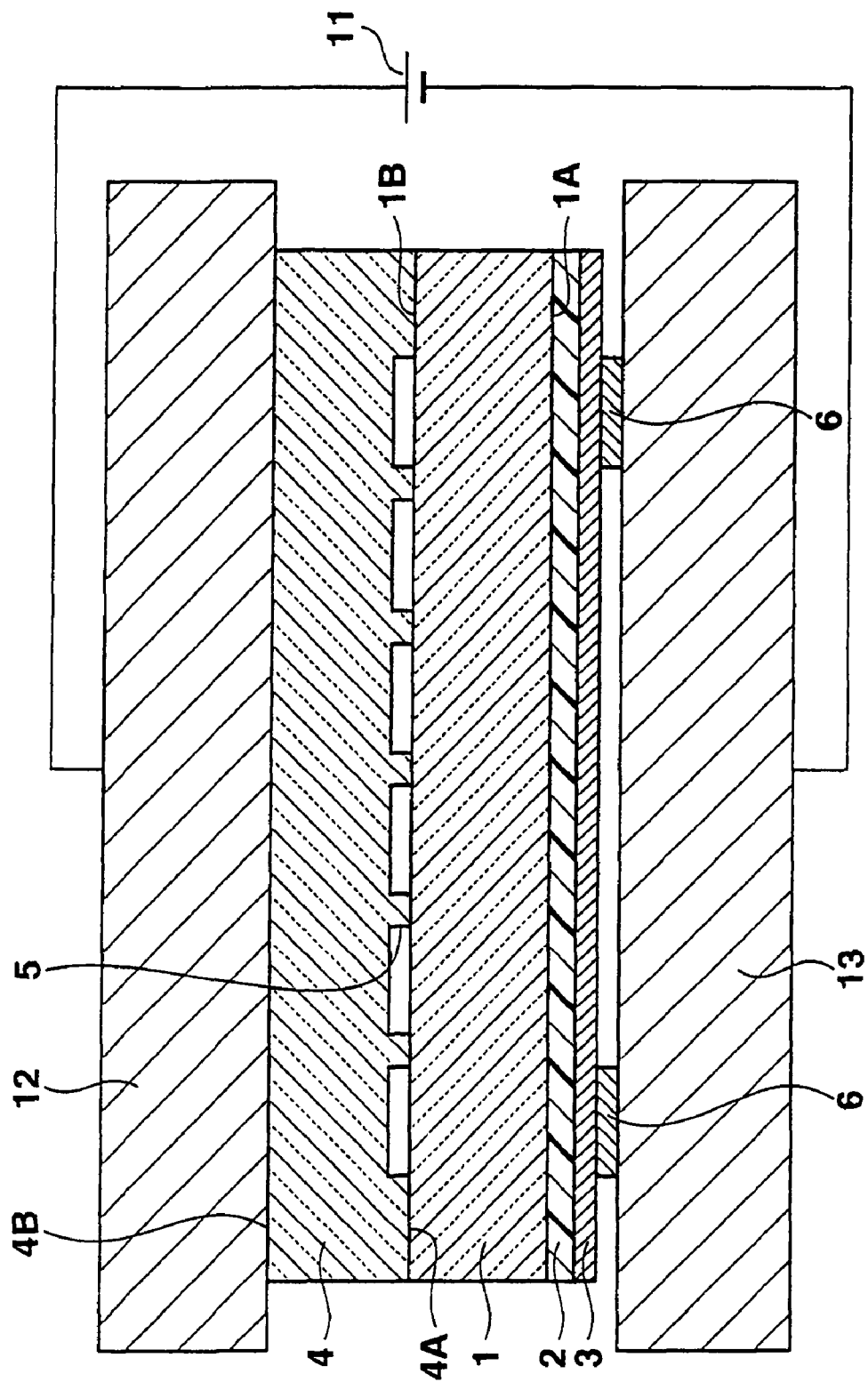
FIG. 14 is a sectional view showing an anodic bonding according to a third embodiment of the present invention.

First, the glass substrate 1 is prepared. Then, as in the case of the first embodiment, the buffer film 2 composed of a Ta—Si—O-based material is formed all over the surface 1A of the glass substrate 1. Once the buffer film 2 has been formed, the steps described below are executed as shown in FIG. 14. As described in the second embodiment, the heating resistant film 3 composed of a Ta—Si—O—N-based material is formed all over the front surface of the buffer film 2. Subsequently, as in the case of the second embodiment, the paired interconnects 6 each having a W—Ti layer that is an underlying layer, an Au layer that is an intermediate layer, and a Ti layer that is a top layer are formed on the front surface of the heating resistant film 3 so that the long sides of the interconnects lie opposite each other, as shown in FIG. 13. Each of the interconnects 6 has a lower sheet resistance than the buffer film 2 and the heating resistant film 3.

Figure 15:
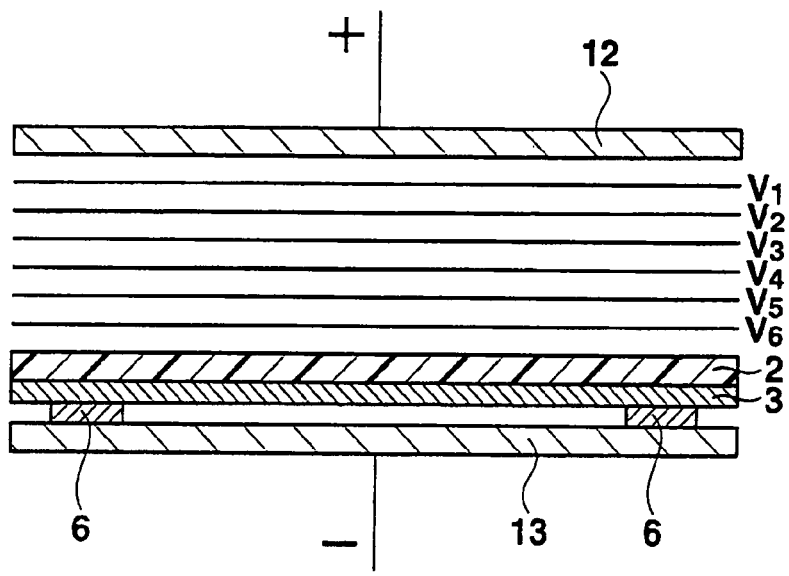
FIG. 15 is a diagram illustrating the distribution of field intensities during an anodic bonding according to the third embodiment.

Once the glass substrate 1 on which the heating resistant film 3 is formed and the substrate 4 have been prepared, the steps described below are executed as shown in FIG. 14. First, the surface 1B of the glass substrate 1 opposite to the surface 1A on which the heating resistant film 3 is formed is abutted against the surface 4A of the substrate 4 in which the concave portion or flow path 5 is formed. Then, the surface 4B of the substrate 4 is connected to the positive electrode 12 of the anodic bonding device 11, while the negative electrode 13 of the anodic bonding device 11 is connected to the interconnects 6. An anodic bonding is thus accomplished to bond the glass substrate 1 and the substrate 4 together. The heating resistant film 3 functions as a buffer film. Accordingly, as shown in FIG. 15, an electric field in the glass substrate 1 is uniform in a surface direction and do not concentrate in the parts of the glass substrate 1 which are close to the interconnects 6. The sodium in the glass substrate 1 is uniformly dispersed through the heating resistant film 3. This makes it possible to reduce the concentration of the sodium in the interconnects 6 and in the parts of the front surface of the heating resistant film 3 which are close to the interconnects 6. The interconnects 6 can be prevented from peeling off from the heating resistant film 3. The heating resistant film 3 can also be prevented from peeling off from the buffer film 2.

In the third embodiment, the anodic bonding may be accomplished by contacting the negative electrode 13 only with parts of the front surface of the heating resistant film 3 on which the interconnects 6 are not provided. Alternatively, the anodic bonding may be accomplished by contacting the negative electrode with both the heating resistant film 3 and the interconnects 6.

In the first to third embodiments, the concave portion 5 is formed only in the substrate 4 to provide a channel through which materials causing a chemical reaction flow. However, the present invention is not limited to this aspect. The concave portion may be formed only in the glass substrate 1. Alternatively, the opposite concave portions may be formed in the glass substrate 1 and the substrate 4, respectively, as a channel.

A junction substrate (a bonded unit of the glass substrate 1 and substrate 4 (including the buffer film 2, the heating resistant film 3, and the interconnects 6) produced using with the bonding method according to the first to third embodiments) in the first to third embodiments can be utilized as a fine reactor called a microreactor. Specifically, a fluid of a material system may be allowed to flow through the channel composed of the concave portion 5 having a depth of about 0.01 to 0.2 mm. Then, the high electric resistant film 3 can be used to heat the channel to allow a chemical reaction to occur in the channel. This junction substrate can be applied as a microreactor that reforms a hydrocarbon such as diethylether or methanol to extract hydrogen. In particular, it is effectively used as an evaporating microreactor that evaporates a liquid or solid hydrocarbon, a hydrogen reforming microreactor that reforms hydrocarbon into hydrogen, carbon monoxide removing microreactor that removes carbon monoxide. Thus, the junction substrate can contribute to reducing the size of a fuel cell the generates power by causing a chemical reaction with water.

Figure 16:
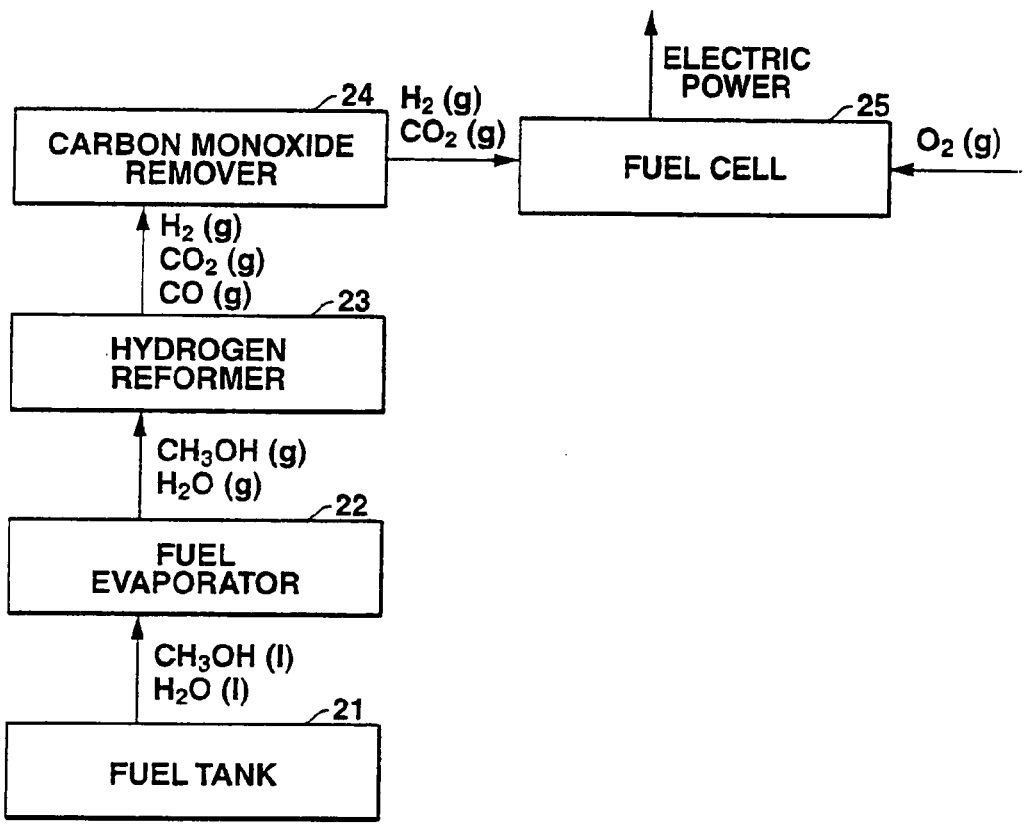
FIG. 16 is a block diagram of a generation system to which an anodically bonded microreactor according to the present invention is applied.

FIG. 16 shows an example of a microreformer to which a microreactor using the substrates 1 and 4 anodically bonded together as described above is applied, the microreformer reforming a fuel into hydrogen supplied to a fuel cell.

Methanol and water which are modified by the micromodifier into water is sealed in a fuel tank 21.

Figure 17:
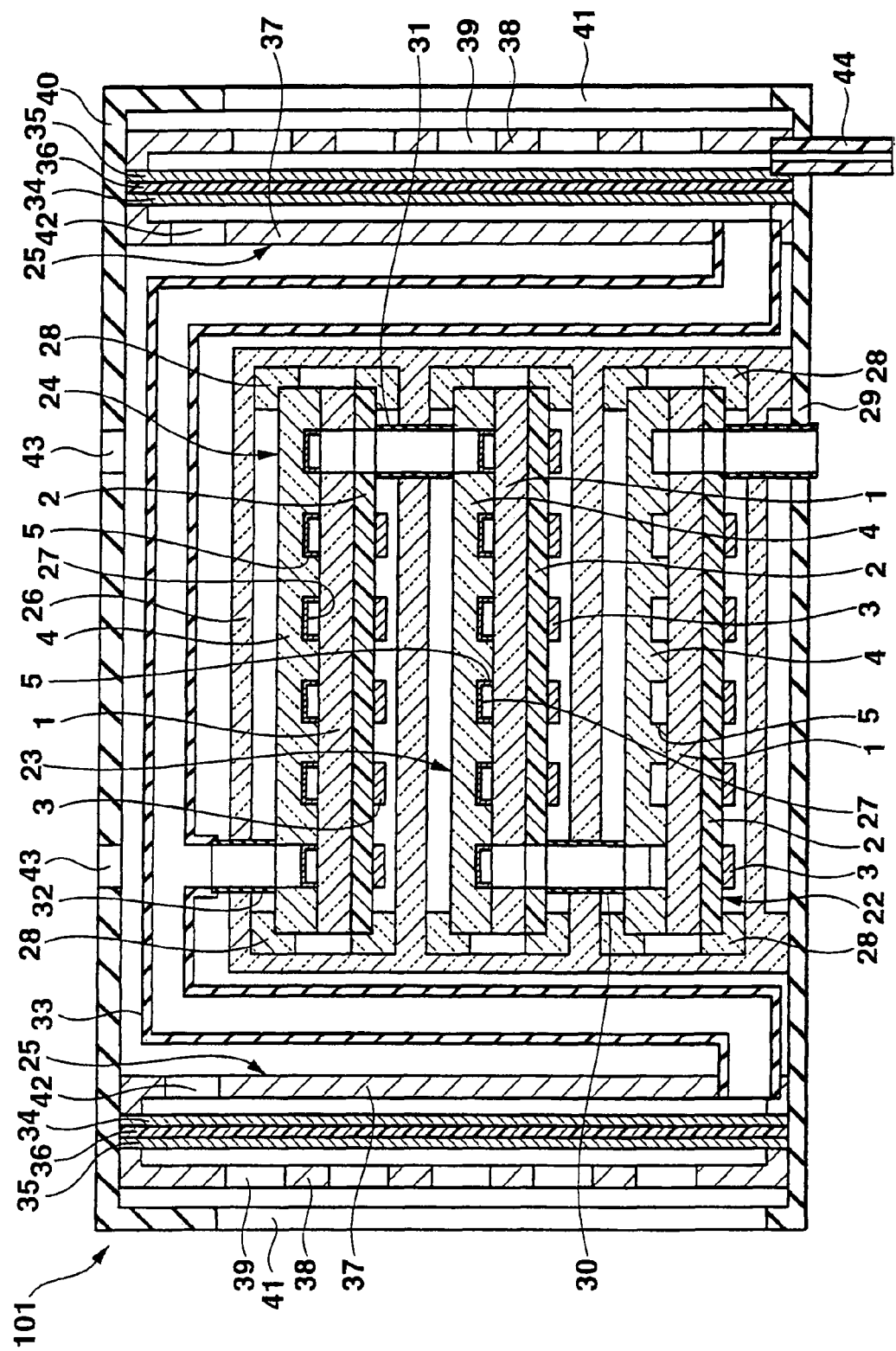
FIG. 17 is a sectional view showing a generation module in the generation system.

A fuel evaporator 22 is a microreformer that uses the internal heating resistant film 3 to heat and evaporate a mixed solution of methanol and water supplied from the fuel tank 21 as shown in FIG. 17.

A hydrogen reformer 23 is a microreformer that causes a hydrogen reforming reaction that reforms the evaporated methanol and water supplied from the fuel evaporator 22 as shown in Reaction Formula (2).

$$CH_3OH + H_2O \rightarrow 3H_2 + CO_2 \qquad (2)$$

A carbon monoxide remover 24 is a microreformer that oxidizes carbon monoxide into carbon dioxide, the carbon monoxide being a byproduct of reaction which occurs in the hydrogen reformer 23 and which also generates hydrogen, as shown in Reaction Formulae (3) and (4).

$$CO + H_2O . CO_2 + H_2 \qquad (3)$$

$$CO + (\tfrac{1}{2})O_2 . CO_2 \qquad (4)$$

As shown in FIG. 17, a fuel cell 25 has a hydrogen pole 34 that causes an electrochemical reaction separating hydrogen generated by the hydrogen reformer 23 via the carbon monoxide remover 24, into hydrogen ions and electrons, a hydrogen ion transmitting film 36 interposed between the hydrogen pole and an oxygen pole 35 to allow the hydrogen ions to pass through, and the oxygen pole that causes an electrochemical reaction between taken-in oxygen and the hydrogen ions and electrons transmitted through the hydrogen ion transmitting film. The fuel cell generates power on the basis of the series of electrochemical reactions.

Description will be given of a generation module 101 composed of the fuel evaporator 22, the hydrogen reformer 23, the carbon monoxide remover 24, and the fuel cell 25.

Each of the fuel evaporator 22, hydrogen reformer 23, and carbon monoxide remover 24 has its upper and lower sides fixed by heat resistant fixing members 28 and its periphery partitioned by heat resistant compartments 26. The space between the compartment 26 and each of the fuel evaporator 22, hydrogen reformer 23, and carbon monoxide remover 24 is set to an inert gas atmosphere with a pressure reduced to 1 Torr or less. Thus, heat from the internal heating resistant film 3 and the like is propagated to the substrates 1 and 4. The space contains only a small amount of medium that propagates heat, resulting in an infrequent convection and a minimum heat loss.

The hydrogen reformer 23 is provided with a catalyst layer 27 that uses aluminum oxide or the like coated on a wall surface of the concave portion 5 to carry a Cu/ZnO-based catalyst causing the reaction expressed in Reaction Formula (2). The carbon monoxide remover 24 is provided with a catalyst layer 27 that uses aluminum oxide or the like coated on a wall surface of the concave portion 5 to carry a Pt catalyst causing the reaction expressed in Reaction Formula (4).

The heating resistant films 3 provided in the fuel evaporator 22, hydrogen reformer 23, and carbon monoxide remover 24 heat the fluid in the concave portions 5 to 120° C., 280° C., and 190° C., respectively, in order to facilitate an evaporation reaction and/or a chemical reaction.

An inflow pipe 29 is provided at one end of the concave portion 5 of the fuel evaporator 23, which receive the fuel from the fuel tank 21, an inflow pipe 30 is connected to the concave portion 5 of the hydrogen reformer 23 in communication with the other end of the concave portion 5 of the fuel evaporator 22 to take in a gas such as evaporated methanol. An inflow pipe 31 is provided at one end of the concave portion 5 of the carbon monoxide remover 24 in communication with the other end of the concave portion 5 of the fuel evaporator 22 to take in a gas such as hydrogen generated by a reforming reaction. An outflow pipe 32 is provided at the other end of the concave portion 5 of the carbon monoxide remover 24 to discharge a hydrogen-rich gas from which carbon monoxide has been removed. The outflow pipe 32 is connected to one end of an inflow pipe 33 through which the hydrogen from the outflow pipe 32 is taken in. The other end of the inflow pipe 33 is connected to the fuel cell 25. The fuel cell 25 surrounds the periphery of the fuel evaporator 22, hydrogen reformer 23, and carbon monoxide remover 24. As described above, the cell 25 has the hydrogen pole 34, the oxygen pole 35, and the hydrogen ion transmitting film 36 interposed between the hydrogen pole 34 and the oxygen pole 35. The cell further includes a collector plate 37 electrically connected to the hydrogen pole 34 and connected to the inflow pipe 33 and having an off gas discharge port 42, and a collector plate 38 electrically connected to the oxygen pole 35 and having a plurality of oxygen take-in ports 39.

The generation module 101 comprises a housing 40 which accommodates the fuel evaporator 22, the hydrogen reformer 23, the carbon monoxide remover 24, and the fuel cell 25. The housing 40 is provided with a plurality of slits 41 which are in communication with the oxygen take-in ports 39, and a plurality of discharge ports 43 that are in communication with the off gas discharge port 42.

A discharge pipe 44 is provided between the oxygen pole 35 and the collector plate 38 to discharge water resulting from power generation.

Figure 18:
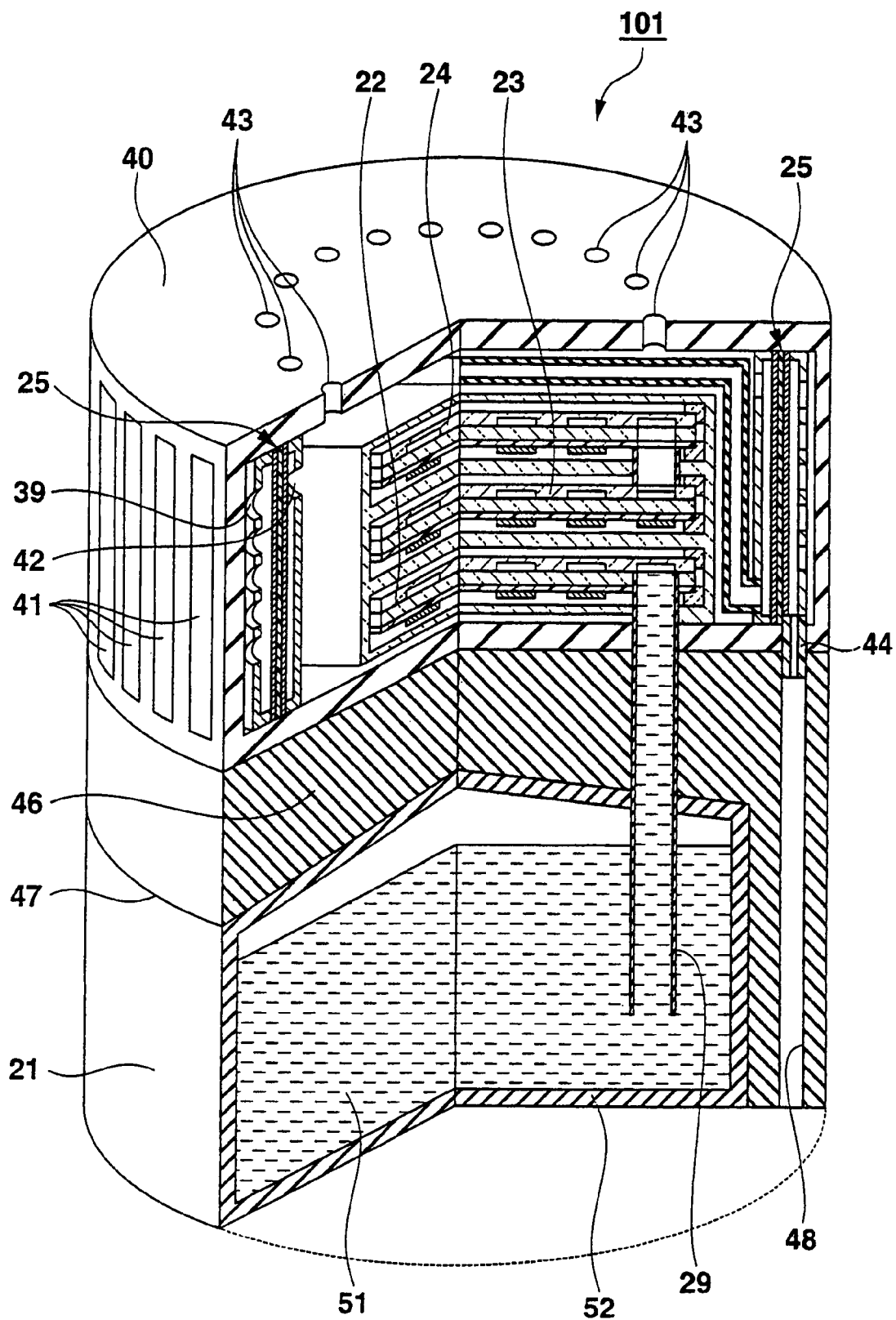
FIG. 18 is a perspective view of the generation system.

FIG. 18 is a perspective view of the generation module 101 connected to the fuel tank 21. The fuel tank 21 has a fuel package 52 in which a fuel 51 containing water and alcohol such as methanol is sealed.

The fuel package 52 is housed in a protective case 46 provided with a window 47 so as to be partly exposed. The protective case 46 functions as an interface between the fuel tank 21 and the generation module 101. The protective case 46 is provided with a take-in pipe 48 through which water discharged from the discharge pipe 44 is drawn in.

When the fuel package 52 is installed in the protective case 46 assembled in the generation module 101, the inflow pipe 29 is inserted into the fuel package 52 and filled with the fuel 51. Accordingly, the fuel 51 can be taken in through the inflow pipe 29.

By applying the thin fuel evaporator 22, hydrogen reformer 23, and carbon monoxide remover 24, which are manufactured by anodic bonding, as a microreformer for the generation module 101 configured as described above, it is possible to reduce the size of the whole structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of bonding a plurality of substrates together to obtain a junction substrate, the method comprising:
    forming a heating resistant film with a predetermined pattern on a buffer film formed on a first surface of a first substrate;
    abutting the first substrate against a second substrate at a second surface of the first substrate which is opposite said first surface on which the buffer film is formed; and
    applying a voltage so that the first substrate operates as a negative electrode while the second substrate operates as a positive electrode, to anodically bond the first and second substrates together;
    wherein the heating resistant film comprises a Ta—Si—O—N-based material.

2. The method of bonding substrates together according to claim 1, wherein the buffer film comprises a Ta—Si—O-based material.

3. The method of bonding substrates together according to claim 1, wherein the heating resistant film has a meandering shape having a plurality of longitudinal portions, and
    wherein a width of each longitudinal portion is defined as $L_A$, a length of each longitudinal portion is defined as $L_B$, a spacing between adjacent longitudinal portions is defined as $L_C$, a sheet resistance of each longitudinal portion is defined as Sh, a sheet resistance of a part of the buffer film which is exposed between the adjacent longitudinal portions is defined as Sf, and a relationship $Sh \times (L_B/L_A) \times 2 \times 100 < Sf \times (L_C/L_B)$ is satisfied.

* * * * *